(No Model.)
J. C. MONTGOMERIE.
APPARATUS FOR SECURING TOGETHER SCAFFOLD POLES.
No. 447,838. Patented Mar. 10, 1891.
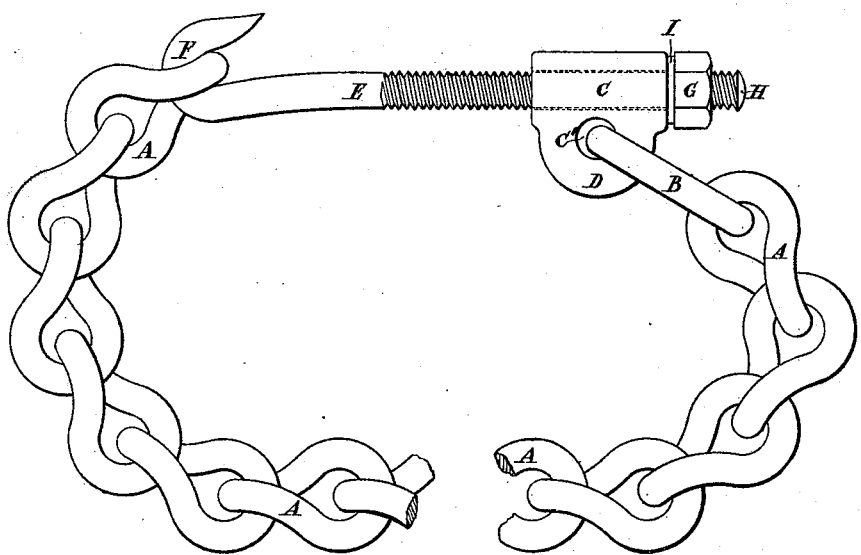

UNITED STATES PATENT OFFICE.

JAMES COLIN MONTGOMERIE, OF BITTERNE, NEAR SOUTHAMPTON, ENGLAND.

APPARATUS FOR SECURING TOGETHER SCAFFOLD-POLES.

SPECIFICATION forming part of Letters Patent No. 447,838, dated March 10, 1891.

Application filed January 13, 1891. Serial No. 377,633. (No model.) Patented in England July 11, 1890, No. 10,813.

*To all whom it may concern:*

Be it known that I, JAMES COLIN MONTGOMERIE, a subject of the Queen of England, residing at Bitterne, near Southampton, England, have invented certain new and useful Improvements in Apparatus for Securing Together Scaffold-Poles, (for which I have obtained Letters Patent of Great Britain No. 10,813, dated July 11, 1890,) of which the following is a specification.

This invention is designed to supersede the method now usually adopted, and which consists in lashing the poles together with ropes or cords. In substitution for the cords I use a chain; and the invention relates to the means employed for securing or connecting together the ends of the chain.

The invention will be best understood by reference to the accompanying drawing, which represents an elevation of the apparatus and chain.

A represents the chain, which may be of any convenient length, and is connected at one end, by a shackle or loop B or otherwise, with a sleeve C through a hole C', in a wing or lug D of which sleeve the loop B or, if preferred, the link of the chain passes, and may then be secured by welding its ends in the usual manner. The sleeve C is free to slide and turn upon the shank E of the hook F. The hook F when in use is intended to engage with any required link of the chain A, so as to adapt the length of the chain to the requirements of the case. The shank E is screwed, preferably, with a quick pitch—as, for example, by employing a double thread—and the screwed portion carries a nut G, which, as it does not require to be removed when once placed on, may be secured by riveting over the end of the screwed shank E, as at H.

I is a washer which may be introduced between the nut G and the sleeve C.

This apparatus is used as follows: The chain is passed round the scaffold-poles in any convenient manner and at any angle according to the positions of the poles. The hook F is then inserted in the proper link of the chain, the nut G to commence with being preferably at or near the end H of the shank E. The nut is now screwed up against the sleeve C, thus reducing the distance between the sleeve and the hook F, with the necessary result of reducing the available length of chain and thus tightening the whole up. To undo the fastening it is merely necessary to slack back the nut G, when the hook F can be disengaged from the chain and the whole removed.

I claim—

1. In a chain fastening for scaffold-poles and the like, the combination, with the chain A, which holds the poles together, of a screw-hook E F, chain-carrying sleeve, such as C D, and nut G, substantially as described, and illustrated in the accompanying drawings.

2. In a chain fastening for scaffold-poles and the like, the combination, with a screw-hook and nut, such as E, F, and G, of a chain-carrying sleeve, such as C D, substantially as described, and illustrated in the accompanying drawings.

In testimony whereof I have hereto set my hand in the presence of the two subscribing witnesses.

JAMES COLIN MONTGOMERIE.

Witnesses:
ALICE MAUD LIME,
ANNIE PERKS YOUNG.